US005497655A

United States Patent [19]

Gee et al.

[11] Patent Number: 5,497,655

[45] Date of Patent: Mar. 12, 1996

[54] CONTROLLING RESISTANCE HEATERS ON EXHAUST GAS OXYGEN SENSORS

[75] Inventors: Thomas S. Gee, Canton; Paul F. Smith, Dearborn Heights; Michael J. Cullen, Northville, all of Mich.

[73] Assignee: Ford Motor Company, Dearborn, Mich.

[21] Appl. No.: 418,225

[22] Filed: Apr. 6, 1995

[51] Int. Cl.$^6$ .................... G01M 19/00

[52] U.S. Cl. .................... 73/118.2; 73/117.3; 60/272

[58] Field of Search .................... 73/117.3, 116, 73/118.1, 118.2; 60/272

[56] References Cited

U.S. PATENT DOCUMENTS 5,291,673 3/1994 Hamburg et al. .................... 123/697

5,365,216 11/1994 Kotwicki et al. .................... 73/118.2

5,390,490 2/1995 Brooks .................... 123/672

5,414,994 5/1995 Gullen et al. .................... 60/274

*Primary Examiner*—Richard Chilcot

*Assistant Examiner*—Max Noori

*Attorney, Agent, or Firm*—Peter Abolins; R. L. May

[57] ABSTRACT

A method of controlling the operation of heaters for an exhaust gas oxygen sensor as function exhaust gas temperature as compared to a first exhaust gas temperature to turn on the heaters and a second exhaust gas oxygen sensor temperature to turn off the heaters.

7 Claims, 4 Drawing Sheets

CONTROLLING RESISTANCE HEATERS ON EXHAUST GAS OXYGEN SENSORS

BACKGROUND OF THE INVENTION

1. Field of the Invention

This invention relates to electronic engine controls for an internal combustion engine.

2. Prior Art

It is known to control the air fuel ratio of an internal combustion engine using various air fuel control strategies. Many factors, such as ambient air pressure, manifold absolute pressure, intake air temperature, have been used in the process of controlling air fuel ratio for an internal combustion engine.

Further, the proper operation of a catalyst processing the exhaust gas from an internal combustion engine depends, in part, upon the air fuel ratio supplied to the engine. Thus, the operational characteristics of the catalyst may be important in determining the proper air fuel ratio. Also, it is known to use an exhaust gas oxygen sensor to sense the concentration of oxygen in the exhaust gas. Knowledge of the exhaust gas oxygen concentration can be used to control the air fuel ratio. It would be desirable to improve control of the air fuel ratio and operation of an exhaust gas oxygen sensor.

It is known to provide heaters for exhaust gas oxygen sensors. However, it has been difficult to control such heaters to become activated only when they are needed because control has typically been time dependent. Other previous approaches have used exhaust gas temperature prediction strategy to estimate the catalyst midbed temperature and the exhaust gas temperature measured near the exhaust flange. If heat is applied too soon to such exhaust gas oxygen sensors, the sensors may crack in the presence of moisture in the exhaust gas. Further, if too much heat is applied to the exhaust gas oxygen sensor, the sensor may not function properly. It would be desirable to improve operation of the exhaust gas oxygen sensor and associated heaters.

SUMMARY OF THE INVENTION

This invention recognizes using exhaust gas temperature as an input function for controlling the heaters of an exhaust gas oxygen sensor (EGO). For example resistance heating elements on the heated EGO (HEGO) sensor are controlled to turn on when an inferred temperature exceeds a calibrateable value and to turn off when a second calibrateable value is exceeded.

In particular embodiments, the operation of the heater may be based on an inferred exhaust gas temperature or on an inferred exhaust gas oxygen sensor temperature.

In accordance with such operation, there is an ability to control the HEGO heaters to increase the reliability of the exhaust gas oxygen sensor assembly. The heater turn on is delayed until liquid water evaporates to prevent cracking of the sensor ceramic. The heater is turned off at high temperatures to prevent heat damage to the HEGO sensor. Turning off the heaters when they are not needed also improves fuel economy.

This invention recognizes that knowledge of the exhaust gas oxygen temperature has at least two purposes: 1) used to determine when water vapor is no longer present near the exhaust gas oxygen sensor so the heater can be turned on without ceramic cracking and 2) used to decide when to turn heater off to protect it from over temperature.

Summarizing, an assessment is made to see if the exhaust gas is warm enough to turn on the heater for the exhaust gas oxygen sensor. The heater is turned on if the exhaust is warm enough, and the heater is turned off when the exhaust gas oxygen sensor has a temperature (e.g. an inferred temperature at the tip of the exhaust gas oxygen sensor) above a second predetermined temperature. Thus, the heater cycles through an OFF-ON-OFF cycle.

DETAILED DESCRIPTION OF THE DISCLOSURE

Figure 1:
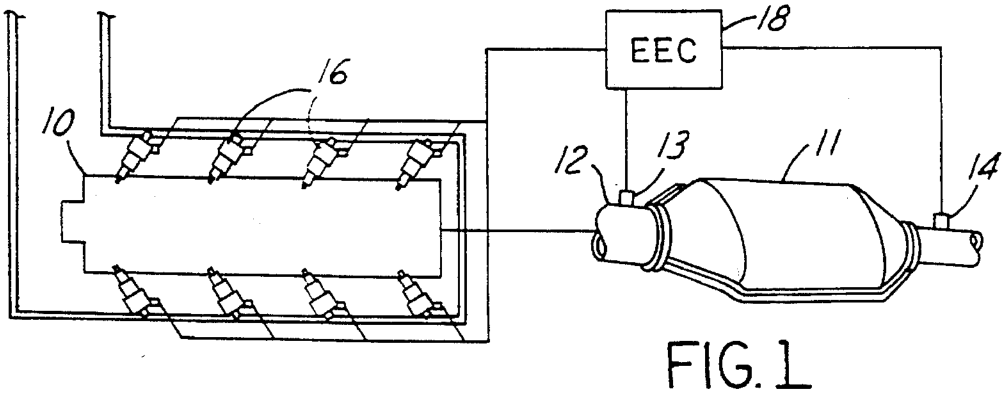
FIG. 1 is a block diagram of an engine and control system in accordance with an embodiment of this invention.

Referring to FIG. 1, an engine 10 has an exhaust gas path 12 coupled to a catalyst 11. An exhaust gas oxygen (EGO) sensor 13, including a heater, is positioned in the exhaust gas flow upstream of catalyst 11 and an exhaust gas oxygen sensor 14, including a heater, is positioned in the exhaust gas flow downstream of catalyst 11. Associated with each sensor 13 and 14 is a resistance heater for providing selective heating of sensors 13 and 14. Output signals from sensors 13 and 14 are applied to an electronic engine control (EEC) module 18 which contains an engine control strategy and produces an output applied to fuel injector 16, which controls fuel injection into engine 10.

When the engine is started a timing sensor associated with an engine electronic engine control (EEC) system indicates the time since the vehicle was last turned off and this value is stored in SOAKTIME, the magnitude representing seconds. The front EGO sensor tip temperature $EXT_{13}FET$ (Front Ego sensor Tip) is modelled as the sum of the unheated tip temperature $EXT_{13}FEU$ (Front Ego sensor Unheated) and the effect of the electrical resistance heater $EXT_{13}FEH$ (Front Ego sensor Heat).

In initialization, each of these components is assumed to cool off with a first order time constant. The EEC exponential function FNEXP is used to predict the temperature components at any time SOAKTIME after the car was turned off. The temperature components value at car turn off are stored in keep alive memory KAM. INFAMB is the inferred or measured ambient temperature. Analogous logic is used for the rear EGO sensor tip temperature.

Figure 2A:
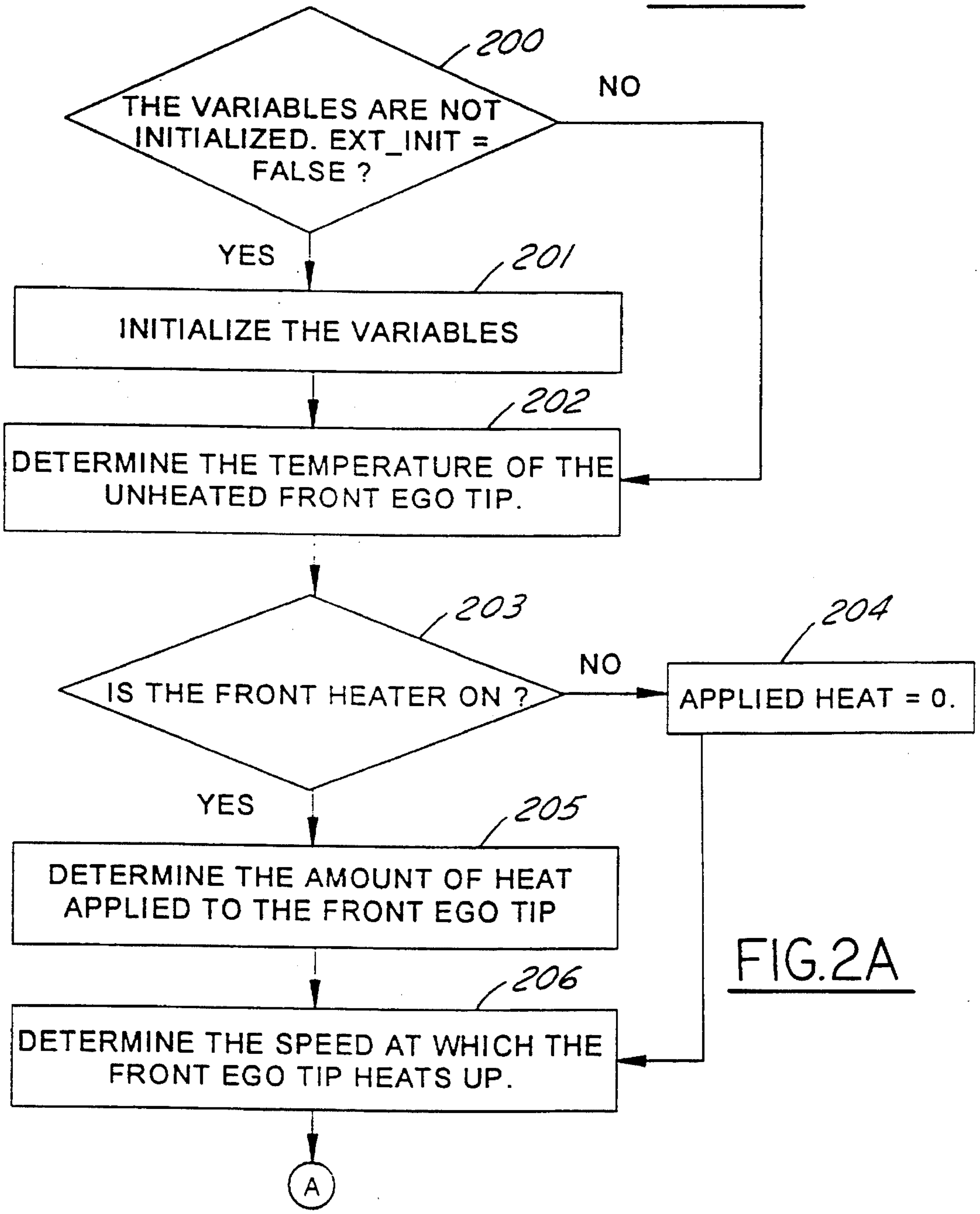
FIGS. 2A and 2B are a logic flow chart for inferring the temperature of the exhaust gas oxygen (EGO) sensors for use in controlling the heaters in accordance with an embodiment of this invention.
Figure 2B:
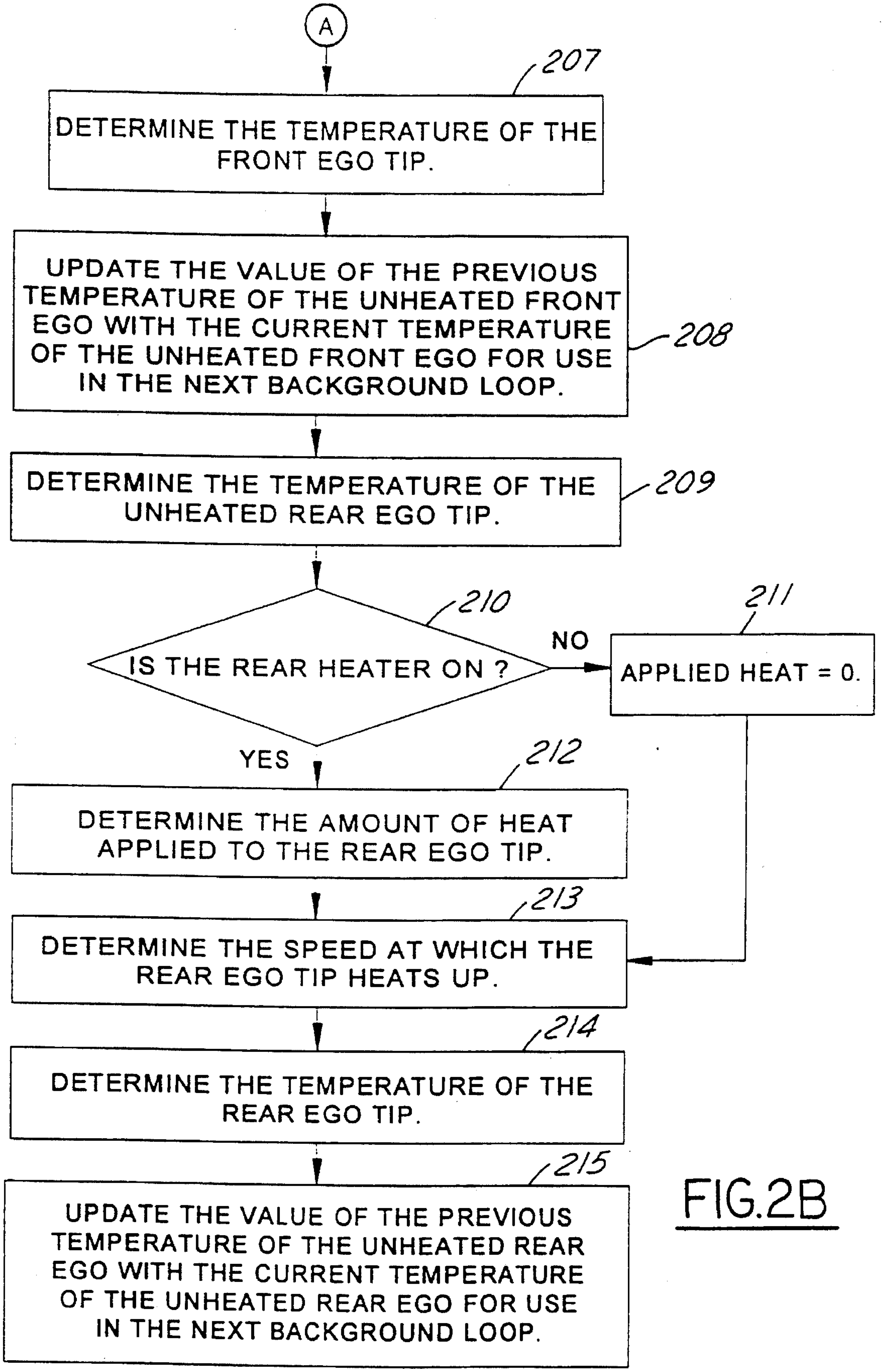

Referring to FIGS. 2A and 2B, the method of inferring temperature of a heated exhaust gas oxygen sensor starts at a decision block 200 wherein it is asked whether a variable has been initialized. $EXT_{13}INIT$ is a boolean variable that is set to FALSE by the EEC only once, during the first background loop of engine strategy operation. If at decision block 200, $EXT_{13}INIT$ does not equal FALSE, the initialization process is skipped and the logic flow continues on to a block 202. If $EXT_{13}INIT$ equals FALSE, logic flow goes on to a block 201 wherein the variables are initialized.

The temperature in degrees of unheated front exhaust gas oxygen sensor 13 ($EXT_{13}FEU$) is determined by the following formula: INFAMB +FNEXP(−SOAKTIME/ $TC_{13}SOAK_{13}FEU$) * ($EXT_{13}FEU_{13}PREV$−INFAMB)

where INFAMB is the inferred ambient temperature in degrees, FNEXP(x) is a lookup table representing the constant e raised to the x, SOAKTIME is the amount of time in seconds that has elapsed since the engine was last turned off, TC$_{13}$SOAK$_{13}$FEU is a calibrateable time constant in degrees per second that describes the speed at which unheated front EGO sensor 13 (EXT$_{13}$FEU) will cool off after the engine is turned off and EXT$_{13}$FEU$_{13}$PREV is the temperature in degrees of unheated front EGO sensor 13 from the previous background loop, before the engine was last turned off. The effect of the heat in degrees that has been applied by the resistance heater to front EGO sensor 13 (EXT$_{13}$FEH) is determined by the following formula: INFAMB+FNEXP(−SOAKTIME/TC$_{13}$SOAK$_{13}$FEH) * (EXT$_{13}$FEH$_{13}$PREV−INFAMB) where TC$_{13}$SOAK$_{13}$FEH is a calibrateable time constant in degrees per second that describes the speed at which the heat applied to front EGO sensor 13 will dissipate and EXT$_{13}$FEH$_{13}$PREV is the effect of the heat in degrees that was applied during the previous background loop before shutoff.

The temperature in degrees of the tip of front EGO sensor 13 (EXT$_{13}$FET) is determined by the following formula: EXT$_{13}$FEU+EXT$_{13}$FEH. The temperature in degrees of unheated rear EGO sensor 14 (EXT$_{13}$REU) is determined by the following formula: INFAMB+FNEXP(−SOAKTIME/TC$_{13}$SOAK$_{13}$REU) * (EXT$_{13}$REU$_{13}$PREV−INFAMB) where TC$_{13}$SOAK$_{13}$REU is a calibrateable constant in degrees per second that describes the speed at which unheated rear EGO sensor 14 (EXT$_{13}$REU) will cool off after the engine is turned off and EXT$_{13}$REU$_{13}$PREV is the temperature in degrees of unheated rear EGO sensor 14 from the previous background loop before shutoff. The effect of the heat in degrees that has been applied by the resistance heater to rear EGO sensor 14 (EXT$_{13}$REH) is determined by the following formula: INFAMB+FNEXP(−SOAKTIME/TC$_{13}$SOAK$_{13}$REH) * (EXT$_{13}$REH$_{13}$PREV−INFAMB) where TC$_{13}$SOAK$_{13}$REH is a calibrateable time constant in degrees per second that describes the speed at which the heat applied to rear EGO sensor 14 will dissipate and EXT$_{13}$REH$_{13}$PREV is the effect of the heat in degrees that was applied during the previous background loop. The temperature in degrees of the tip of rear EGO sensor 14 (EXT$_{13}$RET) is determined by the following formula: EXT$_{13}$REU+EXT$_{13}$REH. The last step of initialization is to set the "initialized" flag (EXT$_{13}$INIT) to TRUE.

From block 201 logic goes to block 202 wherein the temperature of unheated front EGO sensor 13 tip (EXT$_{13}$FEU) is determined. This is done in four steps. The first step is to calculate the temperature loss from the exhaust flange gas temperature to the front EGO sensor 13 temperature (EXT$_{13}$LS$_{13}$FEU) using the following formula: FN443L(AM)* [(EXT$_{13}$FL+EXT$_{13}$FEU$_{13}$PREV) /2−INFAMB] where FN443L(AM) is a table of temperature loss versus a temperature difference calculation. The temperature difference is the average of the exhaust flange gas temperature (EXT$_{13}$FL) and the front EGO sensor 13 tip temperature from the previous background loop (EXT$_{13}$FEU$_{13}$PREV) minus the ambient temperature (INFAMB). The second step is to calculate the steady state temperature in degrees of unheated front EGO sensor 13 (EXT$_{13}$SS$_{13}$FEU) using the following formula: EXT$_{13}$FL−EXT$_{13}$LS$_{13}$FEU. The third step is to calculate the time constant in degrees per second that describes the speed at which the heat from the exhaust of a running engine will change the temperature of the tip of front EGO sensor 13 (TC$_{13}$FEU$_{13}$RUN) by using the function FN443(AM) which determines the time constant for the unheated front EGO tip temperature versus air mass (AM).

The fourth step to determining the temperature of unheated front EGO sensor 13 (EXT$_{13}$FEU) is to calculate the rolling average in degrees of the steady state temperature in degrees of unheated front ego sensor 13 (EXT$_{13}$SS$_{13}$FEU). The rolling average is an average value of a parameter of time. One example would be to have a buffer of fixed length (10 registers) which has the value of the parameter placed into it at a fixed time interval (every one second). If a constant value (3) is put into the buffer every one second, in ten seconds, the buffer would be full of 3's and the rolling average would be 3. The buffer works in a first in first out fashion. In fifteen seconds, the first five 3's would have flowed out of the buffer and five seconds worth of new 3's would have flowed in. The rolling average would still be 3. If at 15 seconds, the constant value was changed to 2. At twenty seconds the buffer would contain five 3's and five 2's. The rolling average would be 2.5. At 25 seconds the buffer would contain ten 2's and the rolling average would be 2. The length of the buffer determines how long it will take the rolling average to reach the steady state value. In this example, the steady state value is 2 and the time it took to get there is ten seconds. The length of time required for the rolling average to change 63.2% of the step change is called one time constant (TC) The time constant is calculated by the following formula: 0.632* (old value−new value). In this example, the time constant would be 0.632* (3−2) or 0.623. The buffer model breaks down into the following equation: new rolling average = old rolling average + ((new data point − old rolling average)* (1−e**(−t/TC))) where t is the amount of time in seconds that has elapsed.

The EEC does not use a buffer approach. Instead, a rolling average in the form of EXT$_{13}$FEU= ROLAV(EXT$_{13}$SS$_{13}$FEU, TC$_{13}$REU$_{13}$RUN) which approximates the above formula is used. The EEC interprets such an instruction to move EXT$_{13}$FEU from its present value toward EXT$_{13}$SS$_{13}$FEU at a time constant of TC$_{13}$FEU$_{13}$RUN. An instantaneous value of the front EGO sensor, EXT$_{13}$FEU, is then calculated as a function of the steady state front EGO temperature EXT$_{13}$SS$_{13}$FEU, the time constant of the temperature rise, TC$_{13}$FEU$_{13}$RUN and the time required for execution of the background loop, BG$_{13}$TMR, according to the following relationships: EXT$_{13}$FEU= (1−FK) * EXT$_{13}$FEU+FK * EXT$_{13}$SS$_{13}$FEU where FK performs an exponential smoothing function according to the following relationship: FK=1 /(1+TC_FEU$_{13}$RUN / BG$_{13}$TMR).

From block 202, logic flow goes to a decision block 203 wherein it is asked if the front heater in on (FRONT$_{13}$HEATER$_{13}$ON). If no, logic flow goes to a block 204 which sets the temperature in degrees of applied heat (EXT$_{13}$SS$_{13}$FEH) to 0. Then logic flow continues on to block 206.

If, at decision block 203, the front heater is on, logic flow goes to a block 205 which determines the effect of the heat in degrees that has been applied to the tip of front EGO sensor 13. This is done by using a linear equation versus the EGO temperature in the following formula: EXT$_{13}$FEH$_{13}$INT−EXT$_{13}$FEH$_{13}$SLP * EXT$_{13}$ FEU where EXT$_{13}$FEH$_{13}$INT is the intercept of the applied heat, EXT$_{13}$FEH$_{13}$SLP is the slope of the applied heat and EXT$_{13}$FEU is the temperature in degrees of unheated front EGO sensor 13. As an alternate embodiment of the above formula, one could allow for more complex behavior by having a table look up of the effect of the applied heat (EXT$_{13}$SS$_{13}$FEH) versus the temperature of unheated front EGO sensor 13 (EXT$_{13}$FEU) with piece-wise linear interpolation.

From block 205, logic flow goes to a block 206 wherein the speed in degrees per second at which the tip of front EGO sensor 13 will heat is determined. This is done by setting a calibrateable constant that describes the speed at which front EGO sensor 13 will heat up ($TC_{13}FEH_{13}RUN$). As an alternate embodiment, this constant could be a look up table versus air mass (AM). Yet another alternate embodiment would be a look up table versus the temperature of unheated front EGO sensor 13 ($EXT_{13}FEU$). Logic flow then goes to a block 207 which determines the current temperature in degrees of the tip of front EGO sensor 13 ($EXT_{13}FET$). This is a three step process.

The first step is to calculate the rolling average of the amount of heat that was applied to front EGO sensor 13 by the resistance heater ($EXT_{13}SS_{13}FEH$). The second step finds the current temperature in degrees of the tip of front EGO sensor 13 ($EXT_{13}FET$) by adding the temperature in degrees of unheated front EGO sensor 13 ($EXT_{13}FEU$) and the temperature in degrees of the effect of the heat applied by the resistance heater ($EXT_{13}FEH$). From block 207, logic flow continues on to a block 208 which updates the previous value of the temperature in degrees of unheated front EGO sensor 13 ($EXT_{13}FEU_{13}PREV$) with the current value of the temperature in degrees of unheated front EGO sensor 13 ($EXT_{13}FEU$) for use in the next background loop.

From logic block 208, logic flow goes on to a block 209 wherein the temperature of unheated rear EGO sensor 14 tip ($EXT_{13}REU$) is determined. This is done in four steps. The first step is to calculate the temperature loss from the catalytic convertor midbed gas temperature to the rear EGO sensor 14 temperature ($EXT_{13}LS_{13}REU$) using the following formula: $FN450L(AM) * [(EXT_{13}CMD + EXT_{13}REU_{13}PREV) / 2 - INFAMB]$ where FN450L(AM) is a table of temperature loss versus a temperature difference calculation. The temperature difference is the average of the catalytic converter midbed gas temperature ($EXT_{13}CMD$) and rear EGO sensor 14 tip temperature from the previous background loop ($EXT_{13}REU_{13}PREV$) minus the ambient temperature (INFAMB). The second step is to calculate the steady state temperature in degrees of unheated rear EGO sensor 14 ($EXT_{13}SS_{13}REU$) using the following formula: $EXT_{13}CMD - EXT_{13}LS_{13}REU$. The third step is to calculate the time constant in degrees per second that describes the speed at which the heat from the exhaust of a running engine will change the temperature of the tip of rear EGO sensor 14 ($TC_{13}REU_{13}RUN$) by using the function FN450(AM) which determines the time constant for the unheated rear EGO tip temperature versus air mass (AM). The fourth step to determining the temperature of unheated rear EGO sensor 14 ($EXT_{13}REU$) is to calculate the rolling average in degrees of the steady state temperature in degrees of unheated rear EGO sensor 14 ($EXT_{13}SS_{13}REU$).

From block 209, logic flow goes to a decision block 210 wherein it is asked if the rear heater is on ($REAR_{13}HEATER_{13}ON$). If no, logic flow goes to a block 211 which sets the temperature in degrees of applied heat ($EXT_{13}SS_{13}REH$) to 0. Then logic flow continues on to a block 213. If, at decision block 210, the rear heater is on, logic flow goes to a block 212 which determines the effect of the heat in degrees that has been applied to the tip of rear EGO sensor 14. This is done by using a linear equation versus the EGO temperature in the following formula: $EXT_{13}REH_{13}INT - EXT_{13}REH_{13}SLP * EXT_{13}REU$ where $EXT_{13}REH_{13}INT$ is the intercept of the applied heat, $EXT_{13}REH_{13}SLP$ is the slope of the applied heat and $EXT_{13}REU$ is the temperature in degrees of unheated rear EGO sensor 14. As an alternate embodiment of the above formula, one could allow for more complex behavior by having a table look up of the effect of the applied heat ($EXT_{13}SS_{13}REH$) versus the temperature of rear EGO sensor 14 ($EXT_{13}REU$) with piece-wise linear interpolation. From block 212, logic flow goes to a block 213 wherein the speed in degrees per second at which the tip of rear EGO sensor 14 will heat is determined. This is done by setting a calibrateable constant that describes the speed at which rear EGO sensor 14 will heat up ($TC_{13}REH_{13}RUN$). As an alternate embodiment, this constant could be a look up from a table versus air mass (AM). Yet another alternate embodiment would be a lookup table versus the temperature of rear EGO sensor 14 ($EXT_{13}REU$).

From block 213, logic flow then goes to a block 214 which determines the current temperature in degrees of the tip of the rear EGO ($EXT_{13}RET$). This is a three step process. The first step is to calculate the rolling average of the amount of heat that was applied to the rear EGO by the resistance heater ($EXT_{13}SS_{13}REH$). The second step finds the current temperature in degrees of the tip of rear EGO sensor 14 ($EXT_{13}RET$) by adding the temperature in degrees of unheated rear EGO sensor 14 ($EXT_{13}REU$) and the temperature in degrees of the effect of the heat applied by the resistance heater ($EXT_{13}REH$). From block 214, logic flow continues on to a block 215 which updates the previous value of the temperature in degrees of unheated rear EGO sensor 14 ($EXT_{13}REU_{13}PREV$) with the current value of the temperature in degrees of unheated rear EGO sensor 14 ($EXT_{13}REU$) for use in the next background loop.

Figure 3A:
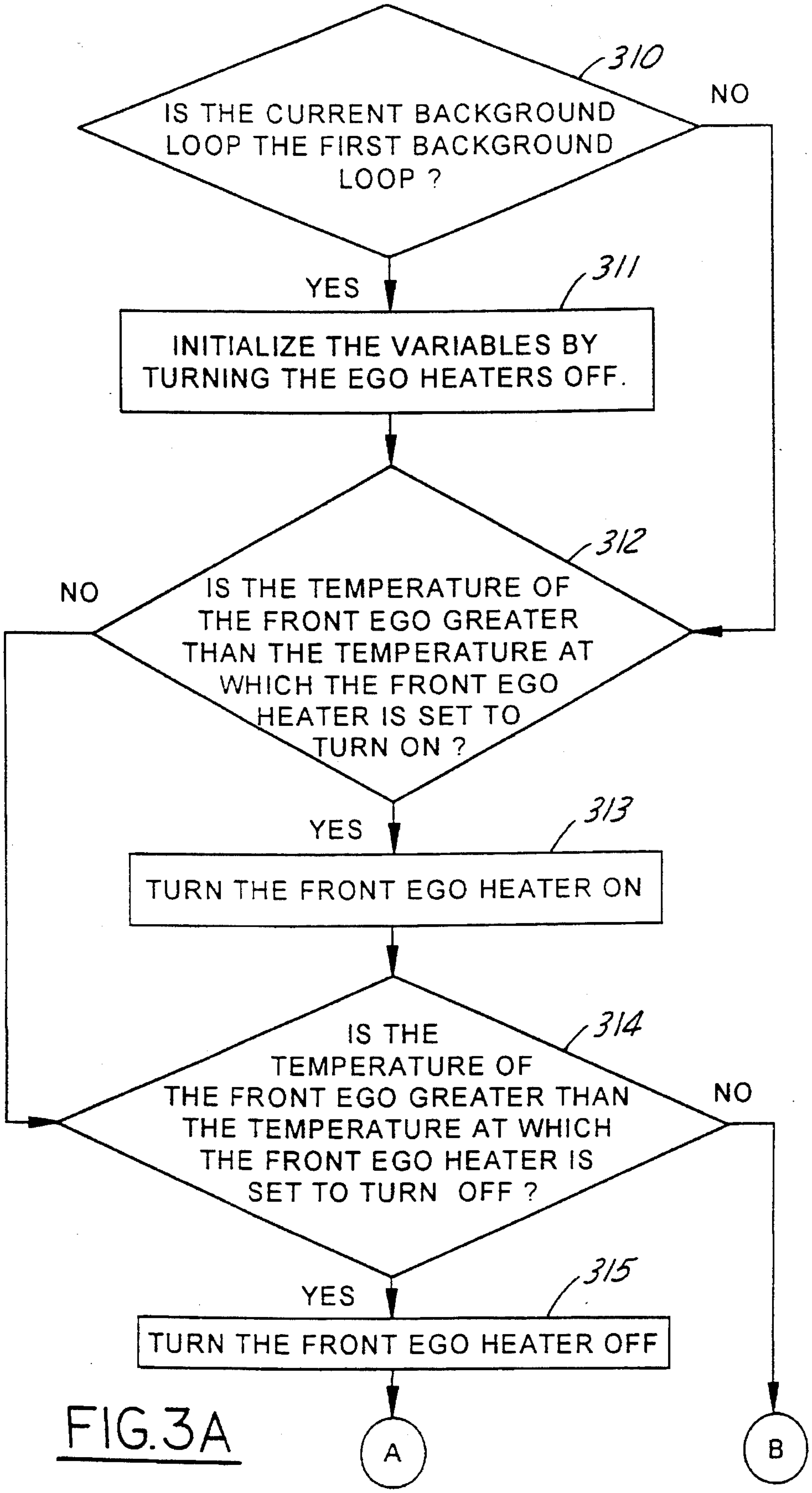
FIGS. 3A and 3B are a logic flow chart for controlling the heaters in accordance with an embodiment of this invention.
Figure 3B:
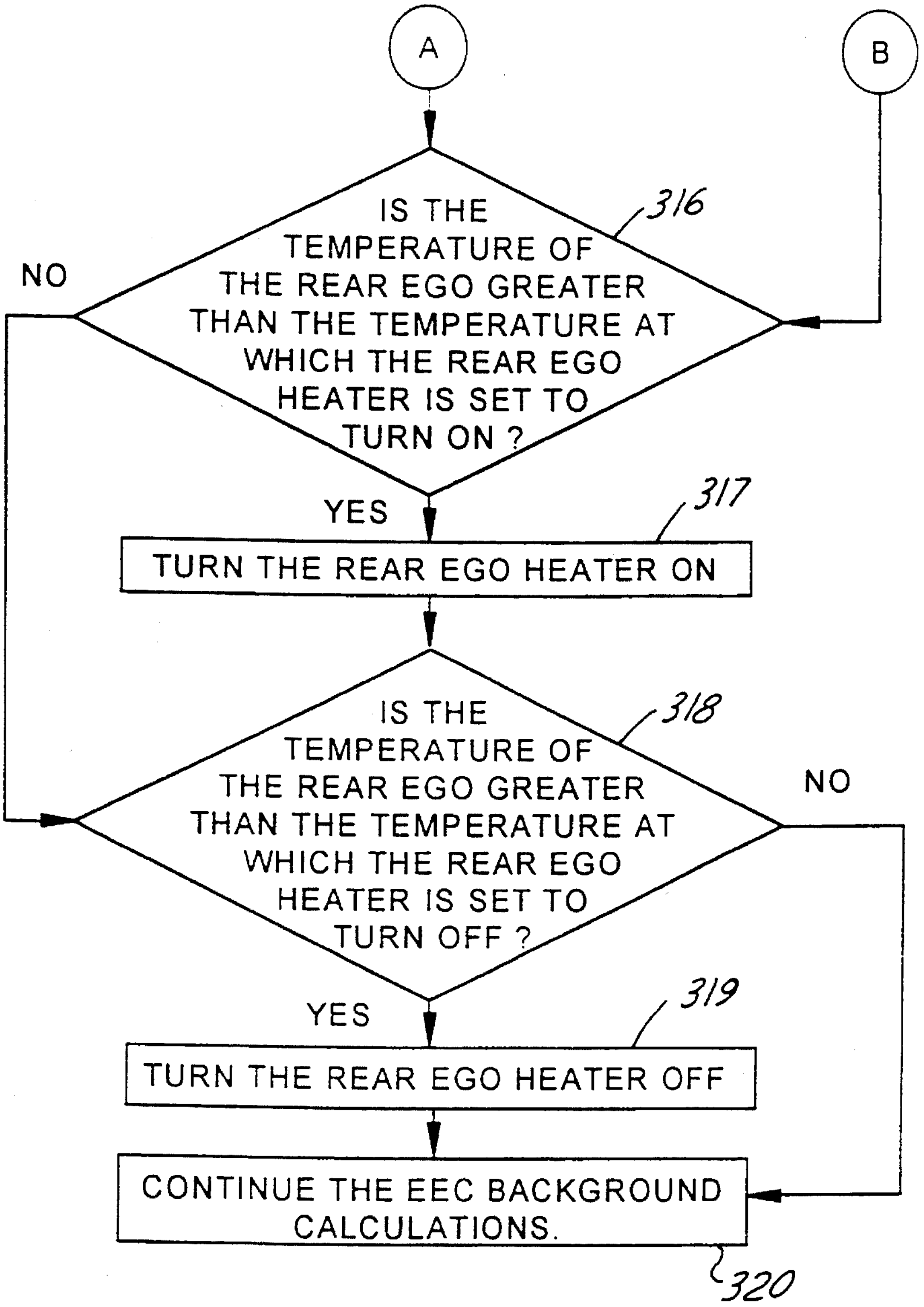

Referring to FIGS. 3A and 3B, at block 310 it is determined if a first background loop has occurred. If yes, logic flow goes to a block 311 wherein a front and rear heater are each turned off. Logic flow from block 311 goes to a block 312. Also, if the answer is no in block 310 logic flow goes to block 312 wherein it is asked if the inferred front EGO sensor temperature is greater than the temperature at which to turn on the front EGO sensor heater. If yes, logic flow goes to a block 313 wherein the front EGO sensor heater is turned on. Logic flow from block 313 goes to a block 314. Also, if the answer is no at block 312 logic flow goes to block 314 where it is asked if the inferred front EGO sensor temperature is greater than the temperature at which to turn the front EGO sensor heater off. Also, in block 314 if the answer is no logic flow goes to a block 316.

Logic flow from block 315 goes to block 316 where it is asked if the inferred rear EGO sensor temperature is greater than the temperature at which to turn the rear EGO sensor heater on. If yes logic flow goes to a block 317 wherein the rear EGO sensor heater is turned on. Logic flow from block 317 goes to a block 318. Also, logic flow from block 316 if the answer is no goes to block 318 where it is asked if the inferred rear EGO sensor temperature is greater than the temperature at which to turn the rear EGO sensor heater off. If yes logic flow goes on to a block 319 wherein the rear EGO sensor heater is turned off. Logic flow from 319 exits at block 320. Also, logic flow from block 318 if the answer is no exits at block 320.

Various modifications and variations will no doubt occur to those skilled in the arts to which this invention pertains. These and all other variations which basically rely on the teachings through which this disclosure has advanced the art are properly considered within the scope of this invention.

We claim:

1. A method of controlling a heater of an exhaust gas oxygen (EGO) sensor used by an electronic engine control system for an internal combustion engine, operating by use of a sequence of background loops beginning with the start of engine operation, including the steps of:

determining whether a current background loop is a first background loop since the engine was started;

if yes, initializing variables describing the condition of the heater;

inferring the temperature of an exhaust gas oxygen sensor;

comparing the inferred exhaust gas oxygen sensor temperature to a turn on temperature at which to turn on the exhaust gas oxygen sensor heater;

if such inferred temperature is greater than the turn on temperature, turning on the heater of the exhaust gas oxygen sensor;

comparing the inferred exhaust gas oxygen sensor temperature to a turn off temperature at which to turn off the exhaust gas oxygen sensor heater; and if such inferred temperature is greater than the turn off temperature, turning off the heater of the exhaust gas oxygen sensor.

2. A method as recited in claims 1 wherein the steps of controlling the a heater are done for a front exhaust gas oxygen sensor heater and for a rear exhaust gas oxygen sensor heater.

3. A method as recited in claim 2 wherein the step of inferring the exhaust gas oxygen sensor temperature is done as a function of exhaust gas temperature.

4. A method of controlling resistance heaters of exhaust gas oxygen (EGO) sensors used by an electronic engine control system for an internal combustion engine, operating by use of a sequence of background loops beginning with the start of engine operation, including:

determining whether a current background loop is a first background loop since the engine was started;

if yes, initializing the variables describing the condition of the heaters;

determining whether the temperature of a front EGO sensor is greater than a temperature at which a front heater is set to turn on;

if yes, turning the front heater on;

determining whether the temperature of the front EGO sensor is greater than a temperature at which the front heater is set to turn off;

if yes, turning the front heater off;

determining whether a temperature of a rear EGO sensor is greater than a temperature at which a rear heater is set to turn on;

if yes, turning the rear heater on;

determining whether the temperature of the rear EGO sensor is greater than a temperature at which the rear heater is set to turn off;

if yes, turning the rear heater off.

5. A method of controlling the resistance heaters of exhaust gas oxygen sensors as recited in claim 4 wherein initializing the variables describing the condition of the heaters includes turning them off.

6. A method of controlling the resistance heaters on exhaust gas oxygen sensors as recited in claim 5 wherein the EGO sensor heater is turned on when the temperature of the EGO sensor is greater than a calibrateable value that represents the temperature at which the heater can safely be turned on without cracking the EGO sensor due to moisture in the exhaust stream.

7. A method of controlling the resistance heaters of exhaust gas oxygen sensors as recited in claim 3 wherein the EGO sensor heater is turned off when the temperature of the EGO sensor is greater than a calibrateable value that represents the temperature at which the heater must be turned off so that it does not fail due to extreme heat.

* * * * *